United States Patent [19]
Wesemeyer

[11] 3,808,514
[45] Apr. 30, 1974

[54] ELECTRICAL CHARGING CIRCUIT
[75] Inventor: Jürgen Wesemeyer, Nuernberg-Reichelsdorf, Germany
[73] Assignee: Robert Bosch GmB, Stuttgart, Germany
[22] Filed: Feb. 18, 1972
[21] Appl. No.: 227,549

[30] Foreign Application Priority Data
Feb. 27, 1971  Germany............................ 2109390

[52] U.S. Cl..................... 321/47, 307/10, 307/146, 320/57, 320/59
[51] Int. Cl. ........................................... H02m 7/04
[58] Field of Search.......... 307/146, 10; 320/59, 57; 321/8, 47

[56] References Cited
UNITED STATES PATENTS

| | | | |
|---|---|---|---|
| 3,538,301 | 11/1970 | Bray et al............................ | 321/8 R |
| 3,518,522 | 6/1970 | Jaffe et al. ....................... | 307/146 X |
| 3,353,090 | 11/1967 | Sawyer................................. | 322/30 |
| 2,444,458 | 7/1948 | Master................................ | 321/8 R |
| 2,777,107 | 1/1957 | Medlar................................ | 321/8 R |
| 3,461,375 | 8/1969 | Nestler et al. .................... | 321/47 X |

FOREIGN PATENTS OR APPLICATIONS
634,247  3/1950  Great Britain....................... 320/57

Primary Examiner—William M. Shoop, Jr.
Attorney, Agent, or Firm—Michael S. Striker

[57] ABSTRACT

An electrical circuit for charging a battery from an alternator has four diodes and a multi-position switch. Two of the diodes have their cathodes connected to respective output terminals of the alternator and their anodes connected to the circuit ground. A third diode is connected between one of the output terminals of the alternator and the battery to be charged, the cathode of this diode being connected to the battery. The fourth diode is connected between the other output terminal of the alternator and a contact on a switch. The battery is connected to another contact on the switch. The switch has movable contacts which are movable between an inactive position where the two contacts are opened and an active position where the two contacts are shorted. In the inactive position the charging circuit delivers a half-wave rectified charging current to the battery by way of the third diode and that grounded diode which is connected to the other output terminal. When the switch is moved to active position, a full wave rectified charging current is provided to the battery, the four diodes operating as a full wave rectifier.

8 Claims, 2 Drawing Figures

ELECTRICAL CHARGING CIRCUIT

BACKGROUND OF THE INVENTION

The present invention relates to battery charging circuits, and particularly to an electrical charging circuit for charging a battery for an alternator by a diode arrangement and switch arrangement for preventing the overcharging of the battery.

Overcharging of batteries is a common problem, particularly where the charging current to the battery remains substantially at a constant level but where the load connected to the charging circuit and the battery changes over wide ranges. This problem is often found in charging circuits for automobiles. The charging circuit in an automobile charges the battery whenever the engine is operated to thereby turn the alternator or AC generator. However, the load, namely the accessories in the automobile, are not used with the same frequency at all times. Thus, more accessories tend to be utilized during night driving than day driving. For example, during night driving the headlights and taillight consume a substantial amount of power.

Most prior art charging circuits have not taken into account the load variations and have not compensated for them. Thus, the prior art charging circuits have generally been designed to supply a charging current which is sufficiently high to charge both the battery as well as supply the accessories utilized during night driving. However, these circuits continue to provide the same higher charging current during day driving as well. It is generally during day driving that the danger exists of overcharging of the battery.

It has been known to alleviate this problem by utilizing a plurality of charging windings or having one winding which has been divided into several parts. With such arrangements, each charging winding or part of a winding has generally been connected across a separate half-wave or full wave rectifier and to a switch. During day driving, the switch is placed in the day position and only one of the charging windings or only one part of a winding is utilized to charge the battery. When the accessories are utilized, such as the head lights during night driving, the switch is moved to its night position and one or more charging windings or one or more parts of a charging winding are then utilized to charge the battery and supply the accessories.

Such prior art arrangements, however, have disadvantages. Thus, alternators having more than one charging winding or having a charging winding having more than one part have been required, this increasing the complexity of the circuitry as well as the cost. Additionally, the separately induced voltages in the separate charging windings or parts thereof have generally required separate rectification, such as by diode arrangements, this again increasing the cost of the circuitry. In order to lower the cost some prior art circuits have resorted to using half-wave rectifiers rather than full wave rectifiers. Although this may reduce the cost because fewer diodes are utilized, this has the further disadvantage that the charging windings are not fully utilized. Half-wave rectifiers can only deliver one half of the available energy from a source of alternating voltage, thus lowering the efficiency of the whole circuit.

SUMMARY OF THE INVENTION

Accordingly, it is an object of the present invention to provide an electrical apparatus for preventing the overcharging of a battery which does not have the disadvantages known in the prior art.

It is another object of the present invention to provide an electrical apparatus for preventing the overcharging of a battery which is simple in construction and economical to manufacture and which can be efficiently regulated to control the amount of charging currents delivered to the battery.

It is still another object of the invention to provide an electrical apparatus for preventing the overcharging of a battery which is simple in construction and which only requires one alternating charging winding.

It is a further object of the present invention to provide an electrical apparatus for preventing overcharging of a battery which automatically increases its current output as the load increases, to thereby maintain the charging current to the battery at a substantially constant level.

According to the present invention, the electrical apparatus for preventing the overcharging of a battery, in particular a storage battery in a motor vehicle, comprises a source of alternating current having two output terminals. First rectification means are provided which are connected to the output terminals and to the battery to supply a half wave rectified charging current to said battery. Second rectification means are provided which are connected to the output terminals. Also provided are switch means which are connected to said second rectification means and which is movable between an inactive position and an active position. In the inactive position, the second rectification means is disconnected from said battery and the latter is charged only by said half wave rectified charging current. In the active position, the second rectification means is connected to said battery so that the latter receives a full wave rectified charging current.

In accordance with a presently preferred embodiment, the first and second rectification means each comprise half wave rectifiers which are connectable, by said switch means, to form a full wave rectifier. The switch means comprises a shorting contact switchable between at least two positions. At least two contacts of the switch means are shortable by said shorting contact in one of said positions. One contact is connected to the second rectification means and the other contact is connected to the battery. The contacts are not connected to each other in one of the positions of the shorting contact. Further a third contact is provided which is also shortable by the shorting contact to the other contacts in the one position, the third contact being connected to a load which is to be supplied with current by said electrical apparatus and by said battery. With such an arrangement, for example, during night driving, the three contacts are shorted when the shorting contact is brought into the one or night position. The associated contacts are thereby shorted, placing the two rectification means into a full wave bridge rectifier arrangement to thereby provide the increased current output necessary to charge the storage battery as well as to supply current to the load, such as headlights. When the shorting contact is moved to the other or day position, the three contacts are no longer connected to each other, the load is disconnected, the second rectification means is made inactive, and only the first rectification means is utilized to provide the lower current now necessary only to supply a charging current to the battery.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
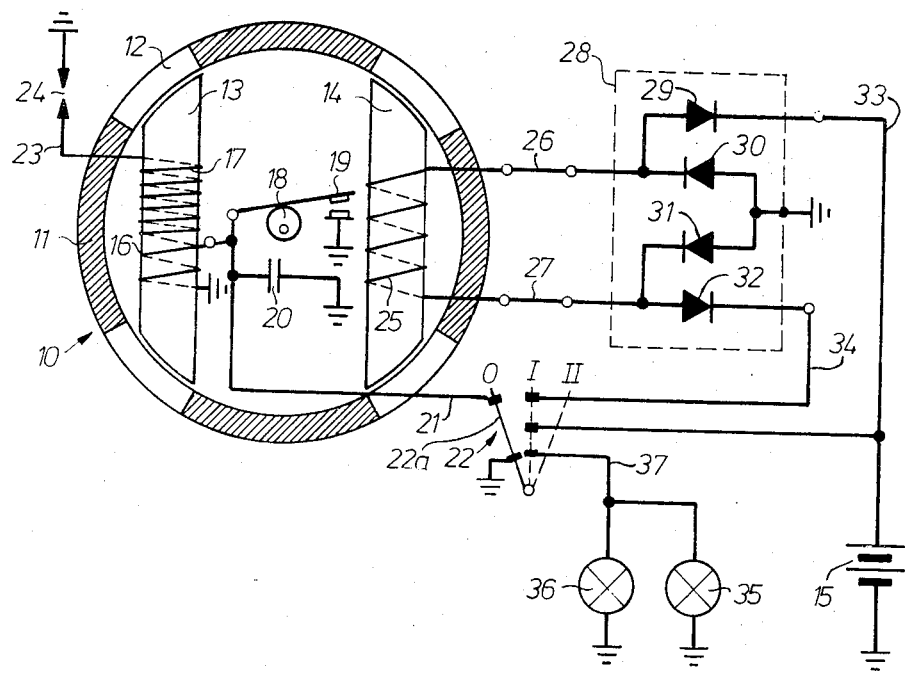
FIG. 1 illustrates, partly in schematic manner, a charging circuit in accordance with the present invention, showing an ignition generator with one charging winding.

Referring to FIG. 1, the reference numeral 10 designates a fly-wheel dynamo magnetic ignition unit for a motor vehicle, such as a snowmobile. Such a unit is provided with a plurality of permanent magnets 11 uniformally spaced from each other about the periphery of a fly wheel 12. Within the flywheel 12 is located an ignition armature 13 to provide the ignition sparks to an internal combustion engine (not shown), in a manner to be described. Although the present invention will be described in connection with snowsleds or snowmobiles, this is merely illustrative and is not intended to limit the applications of the present invention to these motor vehicles. Also positioned within the flywheel 12 is a charging armature 14 for providing a source of energy to the lighting circuit as well as the storage battery 15.

The ignition armature 13 carries a primary winding 16 and a secondary winding 17. The primary winding 16 is connected at one end with the circuit reference point or the circuit ground and is connected at the other end with the secondary winding 17 as well as with an interruptor 19 which is actuated by a rotating cam 18. The common or connecting point between primary and secondary windings is also connected to a grounded ignition capacitor 20 and, over a conductor 21, is connected to a switch 22.

The secondary winding 17 is connected with its high voltage connection over an ignition cable 23 to a spark plug 24.

The charging armature 14 is provided with a charging winding 25 as shown, the terminals of which are connected over conductors 26 and 27 with a rectification unit 28. The rectification unit comprises four diodes 29 to 32. The conductor 26 is connected to two anti-parallel connected diodes 29 and 30. An anti-parallel connection of two diodes is one when each of the diodes is oriented so as to conduct current in an opposite direction. In a similar manner the conductor 27 is connected to anti-parallel connected diodes 31 and 32. The cathodes of the diodes 30 and 31 are respectively connected to the conductors 26 and 27 whereas the anodes of the diodes are both connected to the circuit ground. On the other hand, the anodes of the diodes 29 and 32 are respectively connected to the conductors 26 and 27, whereas the cathodes of these two diodes are respectively connected to the conductors 33 and 34.

The conductors 34 and 33 can be connected to each other by the switch 22, two stationary contacts of which are respectively connected to the conductors 33 and 34. The storage battery 16 is connected to the conductor 33 and is thereby connected to the cathode of the diode 29. The lighting circuit of the snowmobile, here comprising a headlight 35 and a tail-light 36, is connected to a third contact of the switch 22. Although a lighting circuit is here illustrated and described, it is clear that any other load can be utilized in any other motor vehicle charging system.

The switch 22 is shown to have three switching positions. Still referring to FIG. 1, the switch position wherein the shorting contact 22a is in its furthermost counterclockwise position is designated by the reference numeral 0. In this position, the shorting contact connects the conductor 21 to the circuit ground. In this position the primary winding 16 of the armature 13 is thereby short-circuited. This prevents the operation of the internal combustion engine and no sparks can be created at the spark plugs 24.

When driving during the day, the shorting contact 22a of the switch 22 is moved to the dashed position generally designated by I. In this position of the shorting contact, the conductors 33, 34 and 37 are connected with each other through the shorting contact 22a and the induced energy in charging winding 25 is delivered over the rectification unit 28 and the conductors 33 and 34 to both the lighting arrangement as well as the storage battery. In effect by shorting the three contacts in the position I, the four diodes 29 through 32, are placed into a full wave rectification arrangement, with the rectified output therefrom being simultaneously delivered to both the storage battery system as well as the lights 35 and 36.

While driving during the day time, the shorting contact 22a is advantageously, in accordance with the present invention, switched to its position shown by the furthermost clockwise dashed position II. In this position, the three contacts shorted in the position I, are no longer connected to one another. Now, the storage battery 15 is only connected to the diode 29 over the conductor 33 for being charged by the charging winding 25. The charging current now only flows during the positive half cycle as follows: from the charging winding 25, to the diode 29, to the battery 15, to the ground, and from the ground to the diode 31, and again back to the charging winding 2. Thus, one rectification means comprises the diodes 29 and 31, the diode 29 being connected between one of the output terminals and the battery, and the other diode being connected between the other output terminal and the circuit ground. Both diodes are connected to conduct current in the same direction towards the positive pole of the battery. In the position I, when all the diodes are connected in a full-rectification arrangement, the other half of the cycle is passed through the diodes 30 and 32. This also comprises a rectification means, one diode being connected between one of the output terminals of the winding 25, and the switch 22. The other diode is connected between the other output terminal of the charging winding and circuit ground. Again, both of these diodes conduct in the direction of the positive pole of the battery.

With this arrangement, it becomes clear that the battery 15 is charged during day driving only with one half of the total energy supplied during night driving by the charging armature 14. At night when the headlights 35 and 36 must be utilized, the switch 22 is brought to position I, whereby a full wave rectification current is supplied at the output of the rectification unit 28. At night, this increased output current is simultaneously supplied to the load, here the head light 35 and tail light 36, by the switch 22. By selecting the average load, current to approximately equal the current required to charge the storage battery, the increased current output from the rectification unit 8 is substantially utilized for powering the accessories or the load and does not contribute to an increase in the charging current to the battery. In this manner, battery overcharging is prevented.

The objects of the present invention can thus be accomplished without being dependent on whether one or more series connected charging windings are connected to a rectification unit. Of importance is that only two conductors 26, 27 of the alternator are required and that these are connected with the rectification unit 28.

Figure 2:
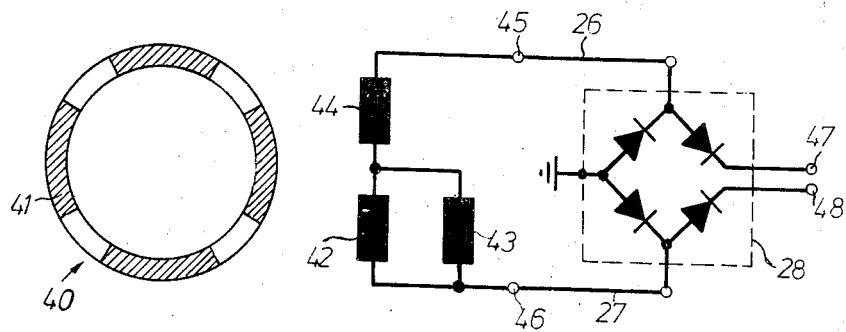
FIG. 2 illustrates a modification of the invention as shown in FIG. 1 wherein a plurality of charging windings are provided and connected to the rectifier unit.

FIG. 2 shows an advantageous application of the present invention, wherein an alternator 40, as described above, includes a rotating pole ring 41 and charging windings 42, 43 and 44 to provide an alternating voltage. The charging windings 42 and 43 are connected in parallel to each other and these two latter windings are connected in series with the charging winding 44. The phase-shifted voltages produced in the series connected charging windings will assure that the generator output produced will remain substantially constant over the entire speed range of the internal combustion engine.

The alternator 40 has its two terminals 45 and 46 connected to the conductors 26 and 27. The rectification unit 28 is contained within a housing 28 which is filled with insulating material to thereby embed the diodes therein. The housing 28 is advantageously connected to the circuit ground. The outputs 47 and 48 and the rectification unit 28 are connected with the conductors 33 and 34 as indicated in the circuit shown in FIG. 1.

It will be understood that each of the elements described above, or two or more together, may also find a useful application in other types of charging circuits differing from the types described above.

While the invention has been illustrated and described as embodied in electrical apparatus for preventing the overcharging of a battery, it is not intended to be limited to the details shown, since various modifications and structural changes may be made without departing in any way from the spirit of the present invention.

Without further analyses, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended.

1. In the electrical system of a vehicle, in combination, a storage battery; an alternator having output winding means; an electrical load; a plurality of diode rectifiers connected to said output winding means; and switch means operative for connecting said load to said battery and for simultaneously so connecting said rectifiers to said battery as to form a diode-bridge rectifier operative for applying to said battery in full-wave-rectified form the entire voltage generated across said output winding means, and alternatively operative for disconnecting said load from said battery and for simultaneously therewith so connecting said rectifiers to said battery as to form a half-wave rectifier operative during voltage half-cycles of one polarity for applying to said battery the entire voltage generated across said output winding means.

2. In the electrical system of a vehicle, in combination, a storage battery; an electrical load; an alternator having a first output terminal and a second output terminal; rectifying means including four diodes having respective first electrodes of like type and respective second electrodes of like type, and including a first diode having its first electrode connected to said first terminal, a second diode having its first electrode connected to ground and its second electrode connected to said first terminal, a third diode having its first electrode connected to ground and its second electrode connected to said second terminal, a fourth diode having its first electrode connected to said second terminal; and a multipole multiple-position switch having a first position in which said load is connected to said battery and in which the respective second electrodes of said first and fourth diodes are connected to one terminal of said battery for to form a diode-bridge rectifier conducting full-wave rectified charging current thereto and are also connected to said load for conducting current thereto, and having a second position in which said load is disconnected from said battery and in which said second electrode of said fourth diode is disconnected from said terminal of said battery, so that said battery is supplied with half-wave rectified charging current conducted by said first diode.

3. In the system as defined in claim 2, wherein said first electrodes are anodes and wherein said second electrodes are cathodes.

4. In the system as defined in claim 2, wherein said diodes are located in a grounded housing and are embedded in insulating material.

5. In the system as defined in claim 2, wherein said alternator includes an output winding arrangement connected between said output terminals and comprising at least two series-connected windings.

6. In the system as defined in claim 2, wherein said alternator includes an output winding arrangement connected between said output terminals and comprising at least two parallel-connected windings.

7. In the system as defined in claim 2, wherein said alternator includes an output winding arrangement connected between said output terminals and comprising at least two parallel-connected windings and a further winding connected in series with said two parallel-connected windings.

8. In the system as defined in claim 2, wherein said load is the vehicle lighting system.

* * * * *